United States Patent
Nyamwange et al.

(10) Patent No.: US 12,517,803 B2
(45) Date of Patent: Jan. 6, 2026

(54) DETECTION OF UNDERUTILIZED DATA CENTER RESOURCES

(71) Applicant: Bank of America Corporation, Charlotte, NC (US)

(72) Inventors: Elvis Nyamwange, Little Elm, TX (US); Erik Dahl, Newark, DE (US); Brian Jacobson, Los Angeles, CA (US); Pratap Dande, St. Johns, FL (US); Hari Vuppala, Charlotte, NC (US); Rahul Yaksh, Austin, TX (US); Rahul Phadnis, Charlotte, NC (US); Amer Ali, Jersey City, NJ (US); Sailesh Vezzu, Hillsborough, NJ (US)

(73) Assignee: Bank of America Corporation, Charlotte, NC (US)

( * ) Notice: Subject to any disclaimer, the term of this patent is extended or adjusted under 35 U.S.C. 154(b) by 434 days.

(21) Appl. No.: 18/224,112

(22) Filed: Jul. 20, 2023

(65) Prior Publication Data

US 2025/0028621 A1 Jan. 23, 2025

(51) Int. Cl.
*G06F 9/44* (2018.01)
*G06F 9/50* (2006.01)
*G06F 11/30* (2006.01)
*G06F 11/34* (2006.01)
*G06N 20/00* (2019.01)

(52) U.S. Cl.
CPC ........ *G06F 11/3476* (2013.01); *G06F 9/5077* (2013.01); *G06F 11/3006* (2013.01); *G06N 20/00* (2019.01)

(58) Field of Classification Search
CPC .................................................. G06F 11/3476
USPC ............................................................. 718/1
See application file for complete search history.

(56) References Cited

U.S. PATENT DOCUMENTS

| | | | |
|---|---|---|---|
| 9,122,537 B2* | 9/2015 | Patel | G06F 9/5088 |
| 9,405,569 B2* | 8/2016 | Greden | G06F 9/45558 |
| 2021/0240539 A1* | 8/2021 | Murthy | G06F 8/60 |
| 2021/0287112 A1* | 9/2021 | Ramasamy | G06N 5/02 |

* cited by examiner

*Primary Examiner* — Timothy A Mudrick
(74) *Attorney, Agent, or Firm* — Weiss & Arons LLP

(57) ABSTRACT

An apparatus may include a computer processor operating in a data center and running an AI/ML model. The apparatus may include a trace log agent and a telemetry agent. The computer processor may be configured to train and run the AI/ML model to determine if a resource in the data center is being utilized or is idle by using data provided by the trace log agent and a telemetry agent. The apparatus may include a status check engine, a discovery engine, and an analytics engine. The computer processor may be configured to run each of these engines to confirm a prediction by the AI/ML model that the resource is idle. The computer processor may be configured to notify an administrator of the data center if the AI/ML model predicts the resource is idle and the engines provide increased confidence to the prediction.

19 Claims, 4 Drawing Sheets

DETECTION OF UNDERUTILIZED DATA CENTER RESOURCES

FIELD OF TECHNOLOGY

Aspects of the disclosure relate to a tool to detect underutilized resources. Aspects of the disclosure relate to a tool to detect underutilized resources in a data center.

BACKGROUND OF THE DISCLOSURE

Underutilized resources in an organization may include a comatose resource. A comatose resource may include a ghost resource and a zombie resource. These terms may refer to a server that is still in operation but is operating far below its optimal capacity. These underutilized resources may have a voracious appetites for an enterprise's resources. These underutilized resources may waste floor space, increase energy consumptions and costs, and drawdown staffing budgets. Resources may be in operation for years without being noticed or used which may result in several lines of business at an enterprise paying for it, costing millions of dollars over time. Aside from wasting money, underutilized resources may present a security risk. For example, a resource that is not functioning productively may also not likely to have the latest security patches, which makes underutilized resources an open door into many enterprise data centers.

Traditional monitoring tools may focus on a resource's availability and performance and can overlook unused resources as a result. Even recently contemplated monitoring tools may focus on only part of the problem. For example, one solution may focus on identifying virtual machines (VMs). This solution relies upon command prompts to users to get data about the VMs.

There is a need for a tool that predicts an underutilized resource for a broader range of resources than VMs.

There is a further need for a tool that predicts an underutilized resource without obtaining data using command prompts.

SUMMARY OF THE DISCLOSURE

It is an objective of the invention to provide a tool that predicts underutilized resources beyond VMs. For example, the tool may predict underutilized servers. the tool may predict underutilized hypervisors.

It is a further objective of the invention to provide a tool that predicts an underutilized resource by obtaining data by means other than using command prompts.

It is a further objective of the invention to provide a tool that predicts an underutilized resource without obtaining data by use of command prompts.

Apparatus and methods for detecting an underutilized resource in a data center.

The method may include identification of an underutilized resource in a data center. The method may include identification of a comatose resource in a data center. The method may include identification of a ghost resource in a data center. The method may include identification of a zombie resource in a data center. The method may include identification of a resource in a data center which is a candidate for decommissioning. The method may include identification of a resource in a data center which is a candidate for redeployment. The redeployment may be in the same data center. The redeployment may be in a location other the same data center.

The method may include a computer processor obtaining historical telemetry data and historical trace log data related to three or more performance metrics from each resource of a resource pair from two or more resource pairs spanning three or more months of usage from more than six months before a current date.

The resource may include a server, a hypervisor, or a virtual machine. The resource pair may include an active server and an idle server, an active hypervisor and an idle hypervisor, or an active virtual machine and an idle virtual machine. The historical telemetry data may come from measurements made by one or more telemetry agents located in proximity to the resource pair which they measure. The historical trace log data may come from measurements made by one or more trace log agents located in proximity to the resource pairs which they measure. The performance metrics may include electricity usage, temperature data, input/output (I/O) utilization, inbound network activity related to secondary and tertiary applications, central processing unit (CPU) utilization, memory usage, connections, disk usage, and fan speed.

The method may include the computer processor calculating activity levels of the resources located in one or more data centers using the historical telemetry data and historical trace log data.

The method may include the computer processor training an artificial intelligence/machine learning ("AI/ML") model. The method may include training the AI/ML model by using the historical telemetry data, the historical trace log data, and calculated activity levels, to predict an activity level of a resource based on recent telemetry data and recent trace log data. The activity level may be a ratio of an average usage of a resource over a period to a maximum usage potential of the resource.

The method may include the computer processor obtaining measurements of performance metrics of a resource in a data center by obtaining recent telemetry data and recent trace log data spanning three or more months within six months before the current date. The recent telemetry data may be measured with a telemetry agent in proximity to the resource. The recent trace log data may be measured with a trace log agent in proximity to the resource.

The method may include the computer processor running the AI/ML model to determine the activity level of the resource over a time spanning three or more months within six months of the current date. To be designated as an active server, an active hypervisor, and an active virtual machine, the resources may have an activity level of at least 10%. To be designated as an idle server, an idle hypervisor, and an idle virtual machine, these resources may have an activity level of less than 10%.

The method may include, when the activity level of the resource is less than 10% spanning three or more months within six months before the current date, the computer processor running a status check engine to assess if applications currently running on the resource are part of routine maintenance.

The method may include, when the activity level of the resource is less than 10% spanning three or more months within six months before the current date, the computer processor running a discovery engine to assess if applications running on the resource spanning months when a status of idle was designated by the AI/ML model are part of routine maintenance.

The method may include the computer processor running an analytics engine to verify that applications assessed to be part of routine maintenance by the AI/ML model are indeed part of routine maintenance based on assessing how the applications have been used on the resource over a lifetime of use of the resource in the data center.

The method may include, when verifying that applications running on the resource are part of routine maintenance, notifying an administrator of the data center that the resource is idle.

The method may include where the resources is a server. The method may include where the resources is a hypervisor. The method may include where the resources is a server and a hypervisor.

The method may include a resource that is not a virtual machine (VM).

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
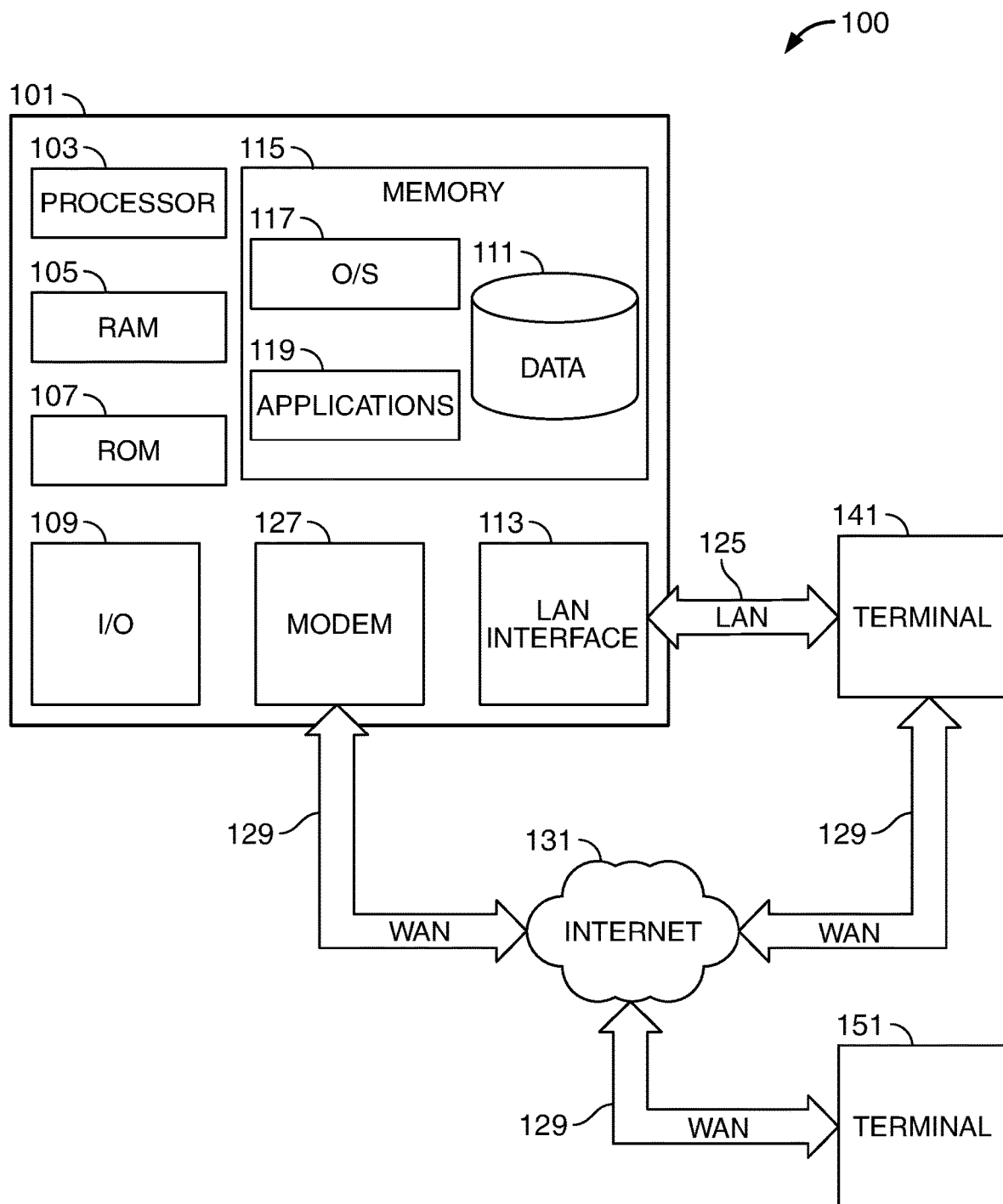
FIG. 1 shows an illustrative block diagram in accordance with principles of the disclosure.

Apparatus and methods for detecting an underutilized resource in a data center.

The method may include identification of an underutilized resource in a data center. The method may include identification of a comatose resource in a data center. The method may include identification of a ghost resource in a data center. The method may include identification of a zombie resource in a data center. The method may include identification of a resource in a data center which is a candidate for decommissioning. The method may include identification of a resource in a data center which is a candidate for redeployment. The redeployment may be in the same data center. The redeployment may be in a location other the same data center.

The method may include using a computer processor to establish an artificial intelligence/machine learning ("AI/ML") model for use in identifying a resource which is underutilized resource. The method may include the computer processor running the AI/ML model to identify the underutilized resource.

The AI/ML model may include a prediction tool. The AI/ML model may predict an activity level of the resource. The method may include using the computer processor to obtain data to help establish the AI/ML model. The AI/ML model may include an algorithm. The algorithm may be designed to make an accurate prediction to understand when the resource is underutilized. Illustrative resources may be found in Table 1.

TABLE 1

| Illustrative resources. |
| Illustrative resources |
| --- |
| Server |
| Hypervisor |
| Virtual Machine (VM) |
| Other suitable resources |

The method may include using telemetry data. The telemetry data may be obtained from a telemetry agent. The telemetry agent may be in proximity to the resource such that the telemetry agent may take measurements of the resource. The telemetry agent may be located remotely from the resource and take measurement remotely from the resource. Measurements may include performance metrics. The measurements may include historical measurements. The measurements may include recent measurements.

The method may include using trace log data. The trace log data may be obtained from a trace log agent. The trace log agent may be in proximity to the resource such that the trace log agent may take measurements of the resource. The trace log agent may be located remotely from the resource and take measurement remotely from the resource. Measurements may include performance metrics. The measurements may include historical measurements. The measurements may include recent measurements.

The method may include using a computer processor to obtain telemetry data such as historical telemetry data. The method may include using a computer processor to obtain trace log data such as historical trace log data. Historical telemetry data, historical trace logs, or both may relate to performance metrics. Examples of performance metrics may be found in Table 2. The computer processor may obtain measurements of the performance metrics from historical telemetry data, historical trace logs, or both. The computer processor may obtain measurements of the performance metrics in a way that is automated. Automated measurement of the performance metrics may include measurements that were obtained without human intervention at the time of collection. The computer processor may obtain measurements of the performance metrics from command prompts. The computer processor may obtain measurements of the performance metrics in a way that avoids obtaining the measurement of the performance metrics from command prompts. The computer processor may obtain measurements of the performance metrics without the use of command prompts.

TABLE 2

| Illustrative performance metrics of a resource. |
| Illustrative performance metrics of a resource |
| --- |
| Electricity usage |
| Temperatures data |
| Input/output (I/O) utilization |
| Inbound network activity related to secondary and tertiary applications, such as traffic coming in from the backup server, domain controller, and antivirus server |
| Central processing unit (CPU) utilization |
| Memory usage |
| Connections, such as connections to a network and connections to other resources |
| Disk usage |
| Fan speed |
| Other suitable performance metrics |

The performance metrics may relate to the resource's performance. The performance metrics may relate to assessing a resource's utilization.

The telemetry data measurements may include historical telemetry measurements. The trace log data measurements may include historical trace log measurements. Table 3 may include illustrative ranges, in months, for historical H ranges for historical data relating to telemetry agents, trace log agents, or both. The units of time presented in Table 3 for columns are in months. The units of time in the columns may be days, weeks, biweeks, months, quarter-years, half-years, years, or other suitable periods.

The method may include the computer processor training the AI/ML model using historical telemetry data measured using telemetry agents located in vicinity to the resource. The computer processor may train the AI/ML model using historical trace log measured using trace logs located in vicinity to the resource. The computer processor may train the AI/ML model using historical telemetry data and historical trace log data using telemetry agents and trace logs in vicinity to the resource. The computer processor may train the AI/ML model with activity levels calculated for resources using historical telemetry and trace log data. Trace logs may measure and capture one or more layers of communication that run on the application. The layers of communication may be the physical layer, the data link layer, the network layer, the transport layer, the session layer, the presentation layer, and the application layer.

TABLE 3

Illustrative ranges for historical H period for historical data which may relate to telemetry agents, trace logs, or both.

| Ranges | | Ranges | | Ranges | |
| --- | --- | --- | --- | --- | --- |
| Over how many months was data collected (months) | How many months in the past were the measurements completed (months) | Over how many months was data collected (months) | How many months in the past were the measurements completed (months) | Over how many months was data collected (months) | How many months in the past were the measurements completed (months) |
| 1 | 1 to 2 | 7 to 8 | 7 to 8 | 10 to 11 | 10 to 11 |
| 1 to 2 | 2 to 3 | 1 to 2 | 8 to 9 | 1 to 2 | 11 to 12 |
| 2 to 3 | 2 to 3 | 2 to 3 | 8 to 9 | 2 to 3 | 11 to 12 |
| 1 to 2 | 3 to 4 | 3 to 4 | 8 to 9 | 3 to 4 | 11 to 12 |
| 2 to 3 | 3 to 4 | 4 to 5 | 8 to 9 | 4 to 5 | 11 to 12 |
| 3 to 4 | 3 to 4 | 5 to 6 | 8 to 9 | 5 to 6 | 11 to 12 |
| 1 to 2 | 4 to 5 | 6 to 7 | 8 to 9 | 6 to 7 | 11 to 12 |
| 2 to 3 | 4 to 5 | 7 to 8 | 8 to 9 | 7 to 8 | 11 to 12 |
| 3 to 4 | 4 to 5 | 8 to 9 | 8 to 9 | 8 to 9 | 11 to 12 |
| 4 to 5 | 4 to 5 | 1 to 2 | 9 to 10 | 9 to 10 | 11 to 12 |
| 1 to 2 | 5 to 6 | 2 to 3 | 9 to 10 | 10 to 11 | 11 to 12 |
| 2 to 3 | 5 to 6 | 3 to 4 | 9 to 10 | 11 to 12 | 11 to 12 |
| 3 to 4 | 5 to 6 | 4 to 5 | 9 to 10 | 1 to 2 | 12 or more |
| 4 to 5 | 5 to 6 | 5 to 6 | 9 to 10 | 2 to 3 | 12 or more |
| 5 to 6 | 5 to 6 | 6 to 7 | 9 to 10 | 3 to 4 | 12 or more |
| 1 to 2 | 6 to 7 | 7 to 8 | 9 to 10 | 4 to 5 | 12 or more |
| 2 to 3 | 6 to 7 | 8 to 9 | 9 to 10 | 5 to 6 | 12 or more |
| 3 to 4 | 6 to 7 | 9 to 10 | 9 to 10 | 6 to 7 | 12 or more |
| 4 to 5 | 6 to 7 | 1 to 2 | 10 to 11 | 7 to 8 | 12 or more |
| 5 to 6 | 6 to 7 | 2 to 3 | 10 to 11 | 8 to 9 | 12 or more |
| 6 to 7 | 6 to 7 | 3 to 4 | 10 to 11 | 9 to 10 | 12 or more |
| 1 to 2 | 7 to 8 | 4 to 5 | 10 to 11 | 10 to 11 | 12 or more |
| 2 to 3 | 7 to 8 | 5 to 6 | 10 to 11 | 11 to 12 | 12 or more |
| 3 to 4 | 7 to 8 | 6 to 7 | 10 to 11 | 12 or more | 12 or more |
| 4 to 5 | 7 to 8 | 7 to 8 | 10 to 11 | Other suitable ranges | Other suitable ranges |
| 5 to 6 | 7 to 8 | 8 to 9 | 10 to 11 | | |
| 6 to 7 | 7 to 8 | 9 to 10 | 10 to 11 | | |

The method may include the AI/ML model identifying an underutilized resource in a data center. The AI/ML model may identify an underutilized resource in a data center with no or minimal on-going human input. To identify an underutilized resource, the AI/ML model may calculate the activity level of a resource. To establish an accurate AI/ML model that can predict a recent activity level of a resource, a computer processor may calculate historical activity levels. The historical activity levels may enable calibrating the AI/ML model to make recent activity level determinations. The activity level is a ratio of an average usage of a resource over a period to a maximum usage potential of the resource.

The AI/ML model may determine which performance metrics to include in the calculation of the activity level. The AI/ML model may quantify a contribution of each performance metric toward an overall assessment of a resource's utilization. The AI/ML model may assign a weighting to each performance metric.

The method may include the computer processor using the measurements of the performance metrics to calculate the activity level of a resource. The activity level may quantify the utilization of a resource compared to the resource's full capacity. An activity level scoring above a certain value may indicate an active resource. An activity level scoring below a certain value may indicate an idle resource.

The method may include an active resource having an activity level of a certain percentage when compared to a full utilization potential of that resource. Table 4 lists illustrative percentages for capacity Ca for how much utilization an active resource exhibits compared to its full capacity.

TABLE 4

Illustrative values of active capacity Ca which may be compared to full utilization of a resource.

| Range Lower limit (%) | Range Upper limit (%) |
|---|---|
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |
| 16 | 17 |
| 17 | 18 |
| 18 | 19 |
| 19 | 20 |
| 20 | 21 |
| 21 | 22 |
| 22 | 23 |
| 23 | 24 |
| 24 | 25 |
| 25 | 26 |
| 26 | 27 |
| 27 | 28 |
| 28 | 29 |
| 29 | 30 |
| 30 | 31 |
| 31 | 32 |
| 32 | 33 |
| 33 | 34 |
| 34 | 35 |
| 35 | 36 |
| 36 | 37 |
| 37 | 38 |
| 38 | 39 |
| 39 | 40 |
| 40 | 41 |
| 41 | 42 |
| 42 | 43 |
| 43 | 44 |
| 44 | 45 |
| 45 | 46 |
| 46 | 47 |
| 47 | 48 |
| 48 | 49 |
| 49 | 50 |
| 50 | 51 |
| 51 | 52 |
| 52 | 53 |
| 53 | 54 |
| 54 | 55 |
| 55 | 56 |
| 56 | 57 |
| 57 | 58 |
| 58 | 59 |
| 59 | 60 |
| 60 | 61 |
| 61 | 62 |
| 62 | 63 |
| 63 | 64 |
| 64 | 65 |
| 65 | 66 |
| 66 | 67 |
| 67 | 68 |
| 68 | 69 |
| 69 | 70 |
| 70 | 71 |
| 71 | 72 |
| 72 | 73 |
| 73 | 74 |
| 74 | 75 |
| 75 | 76 |
| 76 | 77 |
| 77 | 78 |
| 78 | 79 |
| 79 | 80 |
| 80 | 81 |
| 81 | 82 |
| 82 | 83 |
| 83 | 84 |
| 84 | 85 |
| 85 | 86 |
| 86 | 87 |
| 87 | 88 |
| 88 | 89 |
| 89 | 90 |
| 90 | 91 |
| 91 | 92 |
| 92 | 93 |
| 93 | 94 |
| 94 | 95 |
| 95 | 96 |
| 96 | 97 |
| 97 | 98 |
| 98 | 99 |
| 99 | 100 |
| Other suitable lower limits | Other suitable upper limits |

The method may include an active resource having an activity level as a lower limit percentage when compared to a full utilization potential of that resource. Table 5 provides illustrative lower limits for capacity Ca compared to full utilization of a resource.

TABLE 5

Illustrative values of active capacity Ca which may be compared to full utilization of a resource.

| Range Lower limit, (%) or greater |
|---|
| 1 |
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |
| 17 |
| 18 |
| 19 |
| 20 |
| 21 |
| 22 |
| 23 |
| 24 |
| 25 |
| 26 |
| 27 |
| 28 |
| 29 |
| 30 |

TABLE 5-continued

Illustrative values of active capacity Ca which may be compared to full utilization of a resource.

| Range Lower limit, (%) or greater |
| --- |
| 31 |
| 32 |
| 33 |
| 34 |
| 35 |
| 36 |
| 37 |
| 38 |
| 39 |
| 40 |
| 41 |
| 42 |
| 43 |
| 44 |
| 45 |
| 46 |
| 47 |
| 48 |
| 49 |
| 50 |
| 51 |
| 52 |
| 53 |
| 54 |
| 55 |
| 56 |
| 57 |
| 58 |
| 59 |
| 60 |
| 61 |
| 62 |
| 63 |
| 64 |
| 65 |
| 66 |
| 67 |
| 68 |
| 69 |
| 70 |
| 71 |
| 72 |
| 73 |
| 74 |
| 75 |
| 76 |
| 77 |
| 78 |
| 79 |
| 80 |
| 81 |
| 82 |
| 83 |
| 84 |
| 85 |
| 86 |
| 87 |
| 88 |
| 89 |
| 90 |
| 91 |
| 92 |
| 93 |
| 94 |
| 95 |
| 96 |
| 97 |
| 98 |
| 99 |
| Other suitable lower limits |

The method may include an idle resource having an activity level of a certain percentage when compared to a full utilization potential of that resource. Table 6 lists illustrative percentages for capacity Ci for how much utilization an idle resource exhibits compared to its full capacity.

TABLE 6

Illustrative percentages of idle capacity Ci which may be compared to full utilization of a resource.

| Range | |
| --- | --- |
| Lower limit (%) | Upper limit (%) |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |
| 16 | 17 |
| 17 | 18 |
| 18 | 19 |
| 19 | 20 |
| 20 | 21 |
| 21 | 22 |
| 22 | 23 |
| 23 | 24 |
| 24 | 25 |
| 25 | 26 |
| 26 | 27 |
| 27 | 28 |
| 28 | 29 |
| 29 | 30 |
| 30 | 31 |
| 31 | 32 |
| 32 | 33 |
| 33 | 34 |
| 34 | 35 |
| 35 | 36 |
| 36 | 37 |
| 37 | 38 |
| 38 | 39 |
| 39 | 40 |
| 40 | 41 |
| 41 | 42 |
| 42 | 43 |
| 43 | 44 |
| 44 | 45 |
| 45 | 46 |
| 46 | 47 |
| 47 | 48 |
| 48 | 49 |
| 49 | 50 |
| 50 | 51 |
| 51 | 52 |
| 52 | 53 |
| 53 | 54 |
| 54 | 55 |
| 55 | 56 |
| 56 | 57 |
| 57 | 58 |
| 58 | 59 |
| 59 | 60 |
| 60 | 61 |
| 61 | 62 |
| 62 | 63 |
| 63 | 64 |
| 64 | 65 |
| 65 | 66 |
| 66 | 67 |
| 67 | 68 |
| 68 | 69 |
| 69 | 70 |
| 70 | 71 |

TABLE 6-continued

Illustrative percentages of idle capacity Ci which
may be compared to full utilization of a resource.
Range

| Lower limit (%) | Upper limit (%) |
|---|---|
| 71 | 72 |
| 72 | 73 |
| 73 | 74 |
| 74 | 75 |
| 75 | 76 |
| 76 | 77 |
| 77 | 78 |
| 78 | 79 |
| 79 | 80 |
| 80 | 81 |
| 81 | 82 |
| 82 | 83 |
| 83 | 84 |
| 84 | 85 |
| 85 | 86 |
| 86 | 87 |
| 87 | 88 |
| 88 | 89 |
| 89 | 90 |
| 90 | 91 |
| 91 | 92 |
| 92 | 93 |
| 93 | 94 |
| 94 | 95 |
| 95 | 96 |
| 96 | 97 |
| 97 | 98 |
| 98 | 99 |
| 99 | 100 |
| Other suitable lower limits | Other suitable upper limits |

The method may include an idle resource having an activity level less than an upper limit percentage when compared to a full utilization potential of that resource. Table 7 provides illustrative upper limits for idle capacity Ci compared to full utilization of a resource.

TABLE 7

Illustrative values which may relate to idle capacity
Ci compared to full utilization of a resource.
Range
Upper limit, less than (%)

1
2
3
4
5
6
7
8
9
10
11
12
13
14
15
16
17
18
19
20
21
22
23
24
25
26
27
28
29
30
31
32
33
34
35
36
37
38
39
40
41
42
43
44
45
46
47
48
49
50
51
52
53
54
55
56
57
58
59
60
61
62
63
64
65
66
67
68
69
70
71
72
73
74
75
76
77
78
79
80
81
82
83
84
85
86
87
88
89
90
91
92
93

TABLE 7-continued

Illustrative values which may relate to idle capacity
Ci compared to full utilization of a resource.
Range
Upper limit, less than (%)

94
95
96
97
98
99
Other suitable
upper limits

For example, the activity level of an active resource may between 5% and 6%. The activity level of an active resource may between 6% and 7%. The activity level may be 6% or greater. The activity level of an active resource may between 9% and 10%. The activity level of an active resource may between 10% and 11%. The activity level may be 10% or greater.

For example, the activity level of an idle resource may between 5% and 6%. The activity level may be less than 6%. The activity level of an active resource may between 9% and 10%. The activity level may be less than 10%.

The method may include the computer processor training the AI/ML model using historical telemetry data and trace logs located in proximity to an active server, an idle sever, an active hypervisor, an idle hypervisor, an active virtual machine, an idle virtual machine, or any combinations thereof. The method may include the computer processor training the AI/ML model using activity levels calculated from historical telemetry data and trace logs located in proximity to an active server, an idle sever, an active hypervisor, an idle hypervisor, an active virtual machine, an idle virtual machine, or any combinations thereof. A data center may house the active server, the idle sever, the active hypervisor, the idle hypervisor, the active virtual machine, the idle virtual machine, or any combinations thereof.

The computer processor may obtain performance metrics related to active resources. The computer processor may obtain performance metrics related to idle resources. The computer processor may obtain performance metrics related to a resource pair that may include an active resource and an idle resource where the resource is the same. For example, a pair of resources may be an active server and an idle server. A pair of resources may be an active hypervisor and an idle hypervisor. A pair of resources may be an active virtual machine and an idle virtual machine.

The method may include the computer processor obtaining measurements of performance metrics of a resource in a data center by obtaining recent telemetry data and recent trace log data. The computer processor may obtain recent telemetry data from a telemetry agent in proximity to the resource. The computer processor may obtain recent trace log data from a trace log agent in proximity to the resource.

The telemetry data measurements may include recent telemetry measurements. The trace log data measurements may include recent trace log measurements. Table 8 may include illustrative ranges, in months, for recent Rr ranges for recent data measurements relating to telemetry agents, trace log agents, or both.

TABLE 8

Illustrative ranges which may be for recent Rr period for recent data
measurementsrelating to telemetry agents, trace logs, or both.
Range

| Lower limit (months) | Upper limit (months) |
| --- | --- |
| <0.5 | 0.5 |
| 0.5 | 1 |
| <1 | 1 |
| 1 | 1.5 |
| 1 | 2 |
| 1.5 | 2 |
| 2 | 3 |
| 3 | 4 |
| 4 | 5 |
| 5 | 6 |
| 6 | 7 |
| 7 | 8 |
| 8 | 9 |
| 9 | 10 |
| 9 | 10 |
| 10 | 11 |
| 11 | 12 |
| 12 | 13 |
| 13 | 14 |
| 14 | 15 |
| 15 | 16 |
| 16 | 17 |
| 17 | 18 |
| 18 | 19 |
| 19 | 20 |
| 20 | 21 |
| 21 | 22 |
| 22 | 23 |
| 23 | 24 |
| 24 | 25 |
| 25 | 26 |
| 26 | 27 |
| 27 | 28 |
| 28 | 29 |
| 29 | 30 |
| 30 | 31 |
| 31 | 32 |
| 32 | 33 |
| 33 | 34 |
| 34 | 35 |
| 35 | 36 |
| 36 | >36 |
| Other suitable lower limits | Other suitable upper limits |

The method may include the computer processor running the AI/ML model to determine the activity level of the resource over a certain unit of time within a recent unit of time. Table 9 lists units of time over which the activity level may be determined during a total recent period Rp. The units of time presented in Table 9 for columns are in months. The units of time in the columns may be days, weeks, biweeks, months, quarter-years, half-years, years, or other suitable periods.

TABLE 9

Illustrative ranges for recent period Rp for recent data which may relate to telemetry agents, trace logs, or both.

| Range | | Range | | Range | |
|---|---|---|---|---|---|
| Over how many months was data collected (months) | How many months in the past were the measurements completed (months) | Over how many months was data collected (months) | How many months in the past were the measurements completed (months) | Over how many months was data collected (months) | How many months in the past were the measurements completed (months) |
| <1 to 1 | <1 to 1 | 6 to 7 | 7 to 8 | 9 to 10 | 10 to 11 |
| <1 to 2 | 1 to 2 | 7 to 8 | 7 to 8 | 10 to 11 | 10 to 11 |
| <1 to 2 | 2 to 3 | <1 to 2 | 8 to 9 | <1 to 2 | 11 to 12 |
| 2 to 3 | 2 to 3 | 2 to 3 | 8 to 9 | 2 to 3 | 11 to 12 |
| <1 to 2 | 3 to 4 | 3 to 4 | 8 to 9 | 3 to 4 | 11 to 12 |
| 2 to 3 | 3 to 4 | 4 to 5 | 8 to 9 | 4 to 5 | 11 to 12 |
| 3 to 4 | 3 to 4 | 5 to 6 | 8 to 9 | 5 to 6 | 11 to 12 |
| <1 to 2 | 4 to 5 | 6 to 7 | 8 to 9 | 6 to 7 | 11 to 12 |
| 2 to 3 | 4 to 5 | 7 to 8 | 8 to 9 | 7 to 8 | 11 to 12 |
| 3 to 4 | 4 to 5 | 8 to 9 | 8 to 9 | 8 to 9 | 11 to 12 |
| 4 to 5 | 4 to 5 | <1 to 2 | 9 to 10 | 9 to 10 | 11 to 12 |
| <1 to 2 | 5 to 6 | 2 to 3 | 9 to 10 | 10 to 11 | 11 to 12 |
| 2 to 3 | 5 to 6 | 3 to 4 | 9 to 10 | 11 to 12 | 11 to 12 |
| 3 to 4 | 5 to 6 | 4 to 5 | 9 to 10 | <1 to 2 | 12 or more |
| 4 to 5 | 5 to 6 | 5 to 6 | 9 to 10 | 2 to 3 | 12 or more |
| 5 to 6 | 5 to 6 | 6 to 7 | 9 to 10 | 3 to 4 | 12 or more |
| <1 to 2 | 6 to 7 | 7 to 8 | 9 to 10 | 4 to 5 | 12 or more |
| 2 to 3 | 6 to 7 | 8 to 9 | 9 to 10 | 5 to 6 | 12 or more |
| 3 to 4 | 6 to 7 | 9 to 10 | 9 to 10 | 6 to 7 | 12 or more |
| 4 to 5 | 6 to 7 | <1 to 2 | 10 to 11 | 7 to 8 | 12 or more |
| 5 to 6 | 6 to 7 | 2 to 3 | 10 to 11 | 8 to 9 | 12 or more |
| 6 to 7 | 6 to 7 | 3 to 4 | 10 to 11 | 9 to 10 | 12 or more |
| <1 to 2 | 7 to 8 | 4 to 5 | 10 to 11 | 10 to 11 | 12 or more |
| 2 to 3 | 7 to 8 | 5 to 6 | 10 to 11 | 11 to 12 | 12 or more |
| 3 to 4 | 7 to 8 | 6 to 7 | 10 to 11 | 12 or more | 12 or more |
| 4 to 5 | 7 to 8 | 7 to 8 | 10 to 11 | Other suitable ranges | Other suitable ranges |
| 5 to 6 | 7 to 8 | 8 to 9 | 10 to 11 | | |

The method may include detecting an underutilized resource. The underutilized resource may include a comatose resource. An underutilized resource may include a resource that has been idle over a certain unit of time within a recent unit of time. Table 10 illustrates ranges of idle units of time over a recent unit of time. The computer processor may run the AI/ML model to determine if a resource meets the underutilization criteria. The units of time presented in Table 10 for columns are in months. The units of time in the columns may be days, weeks, biweeks, months, quarter-years, half-years, years, or other suitable periods.

TABLE 10

Illustrative ranges of units of time over which activity level may be determined to be idle during a total recent period.

| Range | | Range | | Range | |
|---|---|---|---|---|---|
| Activity level determined to be idle (months) | Total recent period (months) | Activity level determined to be idle (months) | Total recent period (months) | Activity level determined to be idle (months) | Total recent period (months) |
| 1 | 1 | 7 | 7 | 10 | 10 |
| 1 to 2 | 2 or less | 1 to 8 | 8 or less | 1 to 11 | 11 or less |
| 2 | 2 | 2 to 8 | 8 or less | 2 to 11 | 11 or less |
| 1 to 3 | 3 or less | 3 to 8 | 8 or less | 3 to 11 | 11 or less |
| 2 to 3 | 3 or less | 4 to 8 | 8 or less | 4 to 11 | 11 or less |
| 3 | 3 | 5 to 8 | 8 or less | 5 to 11 | 11 or less |
| 1 to 4 | 4 or less | 6 to 8 | 8 or less | 6 to 11 | 11 or less |
| 2 to 4 | 4 or less | 7 to 8 | 8 or less | 7 to 11 | 11 or less |
| 3 to 4 | 4 or less | 8 | 8 | 8 to 11 | 11 or less |
| 4 | 4 | 1 to 9 | 9 or less | 9 to 11 | 11 or less |
| 1 to 5 | 5 or less | 2 to 9 | 9 or less | 10 to 11 | 11 or less |
| 2 to 5 | 5 or less | 3 to 9 | 9 or less | 11 | 11 |
| 3 to 5 | 5 or less | 4 to 9 | 9 or less | 1 to 12 | 12 or less |
| 4 to 5 | 5 or less | 5 to 9 | 9 or less | 2 to 12 | 12 or less |
| 5 | 5 | 6 to 9 | 9 or less | 3 to 12 | 12 or less |
| 1 to 6 | 6 or less | 7 to 9 | 9 or less | 4 to 12 | 12 or less |

TABLE 10-continued

Illustrative ranges of units of time over which activity level may be determined to be idle during a total recent period.

| Range | | Range | | Range | |
|---|---|---|---|---|---|
| Activity level determined to be idle (months) | Total recent period (months) | Activity level determined to be idle (months) | Total recent period (months) | Activity level determined to be idle (months) | Total recent period (months) |
| 2 to 6 | 6 or less | 8 to 9 | 9 or less | 5 to 12 | 12 or less |
| 3 to 6 | 6 or less | 9 | 9 | 6 to 12 | 12 or less |
| 4 to 6 | 6 or less | 1 to 10 | 10 or less | 7 to 12 | 12 or less |
| 5 to 6 | 6 or less | 2 to 10 | 10 or less | 8 to 12 | 12 or less |
| 6 | 6 | 3 to 10 | 10 or less | 9 to 12 | 12 or less |
| 1 to 7 | 7 or less | 4 to 10 | 10 or less | 10 to 12 | 12 or less |
| 2 to 7 | 7 or less | 5 to 10 | 10 or less | 11 to 12 | 12 or less |
| 3 to 7 | 7 or less | 6 to 10 | 10 or less | 12 | 12 |
| 4 to 7 | 7 or less | 7 to 10 | 10 or less | Other suitable lower limits | Other suitable upper limits |
| 5 to 7 | 7 or less | 8 to 10 | 10 or less | | |
| 6 to 7 | 7 or less | 9 to 10 | 10 or less | | |

The method may include the computer processor using an AI/ML model to determine a recent activity value using, for example, the recent telemetry data and the recent trace log data. The AI/ML model may determine a lower limit for active capacity Ca as shown in Table 5. The AI/ML model may determine an upper limit for idle capacity Ci as shown in Table 7.

The method may determine the activity level over a unit of time during a recent total period, as may be shown in Table 9. The method may determine if the activity level may be determined to be idle over the unit of time, as may be shown in Table 10.

When the activity level of the resource meets the range for the idle capacity Ci, the method may include the computer processor notifying an administrator of the data center that the resource is idle. For example, when Ci is less than 6%, and the activity level of the resource is less than 6%

When the activity level of the resource meets the range for the idle capacity Ci, the method may include the computer processor notifying an administrator of the data center with identification information associated with the resource. For example, the computer processor may flag the resource's name and IP address.

When the activity level of the resource meets the range for the idle capacity Ci, the method may include the computer processor flagging the resource to the respective data governance (DG) to trigger an event. For example, the computer processor may trigger an event and update custom dashboard showing.

The method may include the computer processor providing the administrator with the activity level of the resource as determined by the AI/ML model.

The method may include the computer processor providing the administrator with an indication that the resource is a candidate for decommissioning. For example, the computer processor may provide the length of time the resource has been considered idle.

When the activity level of the resource meets the range for the idle capacity Ci for time over a period to be a considered an idle resource, the method may include using the computer processor to run a status check engine to assess which applications are currently running on the resource. For example, running the status check engine when the activity level of the resource is less than 6% over three or more of the most recent six months.

The status check engine may tell what is running now on the resource. For example, the AI/ML model may predict that the hypervisor has not been used based on a threshold. Status check engine may be run to determine what is running on the hypervisor at that time. This may facilitate comparison of the AI/ML model to what's taking place in the data center.

When the activity level of the resource meets the range for the idle capacity Ci for the amount of time over a period of time to be a considered an idle resource, the method may include using the computer processor to run an analytics engine to verify that applications assessed to be part of routine maintenance are indeed part of routine maintenance based on assessing how the applications have been used on the resource over the lifetime of use of the resource in the data center. For example, running the analytics engine when the activity level of the resource is less than 6% over three or more of the most recent six months.

The analytics engine may facilitate looking at system data, for example, when a server has been restarted, what system maintenance has been performed, and/or when a patch was installed, all from the time of deployment until the present. The resource itself may save maintenance events, for example, for a short period of time such as six months. However, the analytics engine may give a way to look at events further into the past than is otherwise available. The analytics engine may provide insight as to when the resource was deployed, the original purpose for the deployment of the resource, how the resource's use may have changed over time, and/or what has been run on the resource over its history. The analytics engine may provide insight into the changing utilization of the resource, and whether the resource may be a candidate for decommissioning. The analytics engine may provide context with which to understand a finding by the AI/ML model of an active resource or an idle resource. For example, the AI/ML model may predict that a resource is idle but after using the analytics engine, it may be discovered that the resource has had a low level of activity since its commissioning and the current level of activity is normal, not idle.

When the activity level of the resource meets the range for the idle capacity Ci for time over a period to be a considered an idle resource, the method may include using the computer processor to run a discovery engine to check the accuracy of the AI/ML model in contrast to actual activity on the resource over the same period. For example, running the analytics engine when the activity level of the resource is less than 6% over three or more of the most recent six months.

The discovery engine may facilitate verification of a prediction of the AI/ML model. For example, if the AI/ML model predicts that a resource has been idle for the past five months, the computer processor may run the discovery engine to determine what has been run over that period. Discovery means to determine what kind of applications may have been run on the resources, and the relationships between the applications, to determine if activity of the resource is integral to its productive functioning, or if the activity may just be part of routine maintenance that doesn't indicate a continued need for the resource.

The method may include, for example, where the historical telemetry data and the historical trace log data may be collected over a range of time spanning a total of time of collection as may be found in Table 3. For example, the historical telemetry data and the historical trace log data were collected for three or more months from more than six months in the past.

The method may include obtaining performance metrics Pm for use by the AI/ML model to calculate activity level. Table 11 lists illustrative number of performance metrics Pm for which data may be collected. The performance metrics Pm data may be from historical telemetry data, historical trace log data, or both. The performance metrics Pm data may be from recent telemetry data, recent trace log data, or both.

TABLE 11

Illustrative ranges for number of performance metrics Pm for which data may be collected.
Range
Number of performance metrics
Pm for which data was collected 1
2
3
4
5
6
7
8
9
1 or more
2 or more
3 or more
4 or more
5 or more
6 or more
7 or more
8 or more
9 or more
Other suitable number
of performance metrics The method may include, for example, the computer processor may collect historical telemetry data and historical trace log data for five or more performance metrics from each resource of a resource pair from two or more resource pairs from three or more months more than six month in the past.

The method may include, for example, the computer processor may collect historical telemetry data and historical trace log data for three or more performance metrics from each resource of a resource pair from three or more resource pairs from three or more months more than six month in the past.

The method may include, for example, the computer processor may collect historical telemetry data and historical trace log data for three or more performance metrics from each resource of a resource pair from two or more resource pairs from five or more months more than six month in the past.

The method may include, for example, the computer processor may collect recent telemetry data and recent trace log data for five or more performance metrics from a resource from five or more months within the most recent six month.

The method may include where the resource is a hypervisor. The method may include where the resource is a server. The method may include where the resource is a virtual machine. The method may include where the resource is a resource that is not a virtual machine.

The method may include a computer processor running an AI/ML model to generate a predicted activity level of active or idle for a resource and checking the prediction against data received from a discovery engine.

The method may include a computer processor running an AI/ML model to generate a predicted activity level of active or idle for a resource and checking the prediction against data received from a status check engine.

The method may include a computer processor running an AI/ML model to generate a predicted activity level of active or idle for a resource and checking the prediction against data received from an analytics engine.

The method may include an AI/ML model that learns by providing a predicted activity level of active or idle for a resource to a user for feedback. The computer processor uses the feedback to improve the AI/ML model.

The method may include an AI/ML model that is an AI/ML model that does not learn by obtaining user feedback to improve the AI/ML model.

Illustrative embodiments of apparatus and methods in accordance with the principles of the disclosure will now be described with reference to the accompanying drawings, which form a part hereof. It is to be understood that other embodiments may be utilized, and that structural, functional, and procedural modifications, additions or omissions may be made, and features of illustrative embodiments, whether apparatus or method, may be combined, without departing from the scope and spirit of the disclosure.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement particular abstract data types. A computing system may be operational with distributed computing environments where tasks are performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement particular data types. The invention may also be practiced in distributed computing environments where tasks are performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
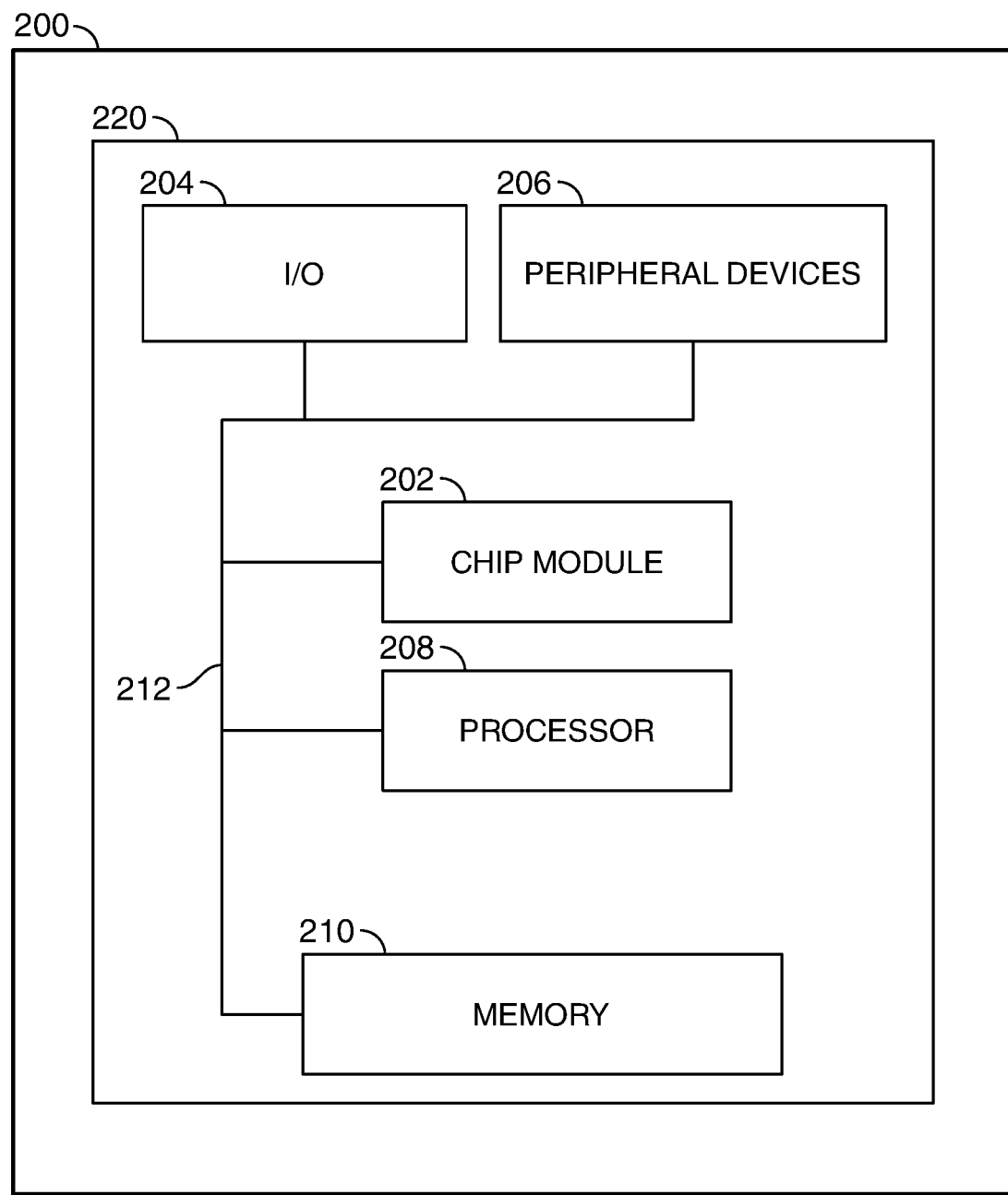
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
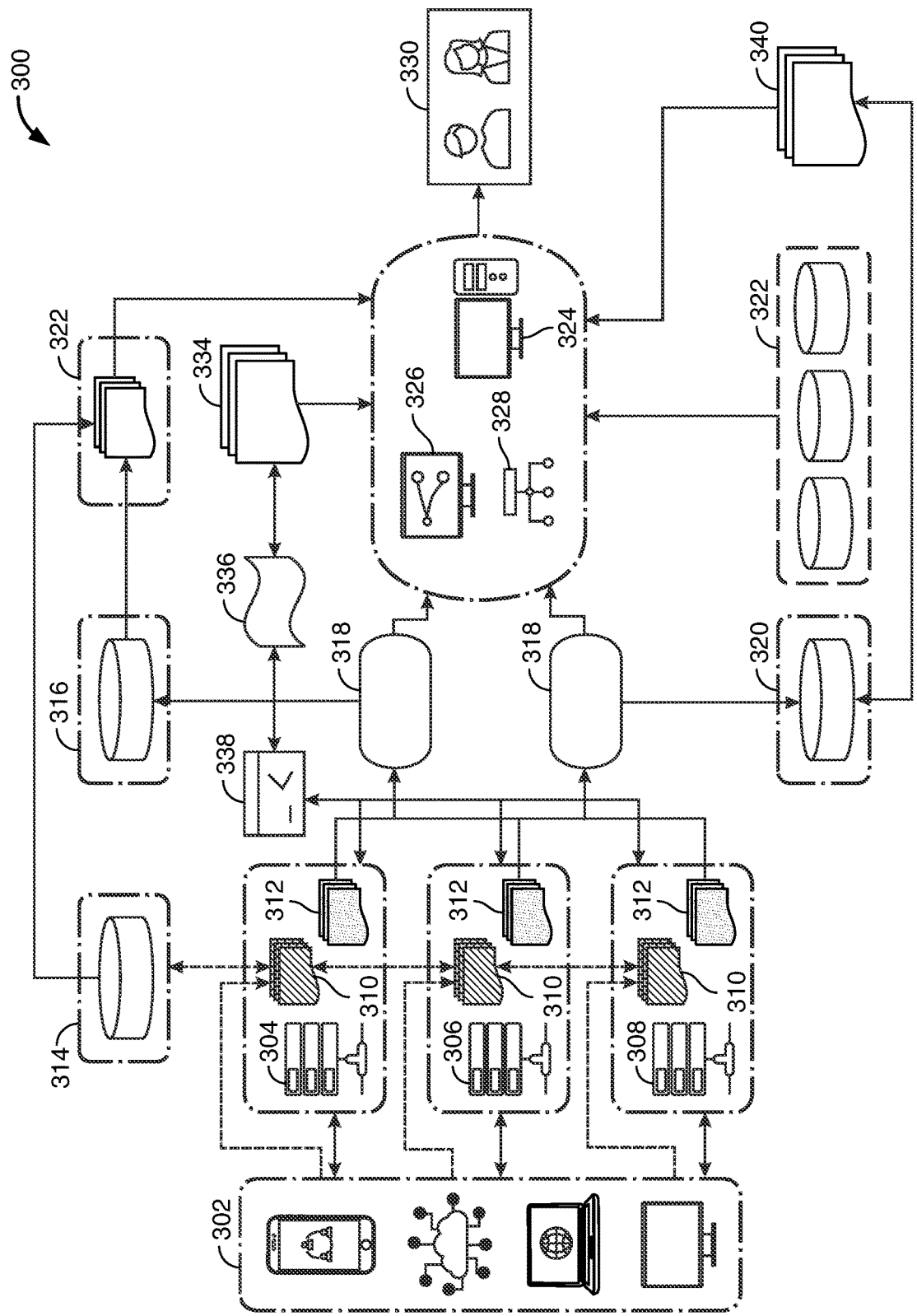
FIG. 3 shows an illustrative block diagram in accordance with principles of the disclosure.

FIG. 3 shows illustrative block diagram 300 which may include an enterprise's data center. Applications 302 may provide a way for user data and customer data to enter the data center.

Virtual machine (VM) 304 may be a resource operating in the data center. Server 306 may be a resource operating in the data center. Hypervisor 308 may be a resource operating in the data center.

Trace log agent 310 may include application trace logs. Trace log agent 310 may provide insight into what is a resource's use. Trace log agent 310 may assess one, more than one, or all the applications 302 deployed on the resource to give context if the resource has been idle and if it should be decommissioned. Trace log agent 310 may be in proximity to a resource such as a VM 304, a server 306, and a hypervisor 308. Trace log agent 310 may store trace data in a trace log database 314. Trace log agent 310 may provide insight to know what a resource is being used for. It may come from assessing all the applications deployed on the resource to give context if the resource should be decommissioned.

Telemetry agent 312 may take measurements of resources to provide performance metric data. Trace log agent 310 may be in proximity to a resource such as a VM 304, a server 306, and a hypervisor 308. Telemetry agent 312 may transmit data to be stored in an event database 316 by way of connector 318. Telemetry agent 312 may transmit data such as system data to be stored in archive database 320 by way of connector 318. Telemetry agent 312 may provide historical data across the system by providing data for the performance metrics. For example, historical H may include over how many months data such as performance metrics were collected and how many months in the past the collection was completed. Connection 318 may connect the data outputs from the agents, for example, trace log agent 310 and telemetry 312, to the databases. Connection 318 may provide for secure transfer of data.

Computer processor 324 may run a classification algorithm 328. Classification algorithm 328 may process raw historical input data 322 to prepare the latter for computer processor 324 to run trained AI/ML model 326. Trained AI/ML model may output a prediction, such activity level. When the activity level indicated a resource that may be idle, computer processor 324 may notify administrator 330 of the data center.

There may be multiple ways in which a prediction of the activity level of a resource by AI/ML model 326 of a resource may be checked. One way may be to use discovery engine 332. Discovery engine 332 may check the accuracy of AI/ML model 326 which predicts, for example, idleness for a period against actual activity over that same period which looks at whether the activity on the resource is integral to its active productive functioning or just part of routine maintenance that should not be considered active use.

Another way to check the accuracy of the prediction of the activity level of a resource may be to use status check engine 334. Status check engine 334 sends a bash script to query script 336 to check with query engine 338 to see what is currently running on the resources. Status check engine 334 may allow for checking accuracy of AI/ML model 326 from a real-time perspective. If there is a prediction from AI/ML model 326 that a resource is idle, status check engine 334 may check VM 304, server 306, and hypervisor 308 to see if indeed little to nothing is running on them, as was predicted. Status check engine 334 may not assess the quality of the utilization.

A further way to check the accuracy of the prediction of the activity level of a resource may be to use analytics engine 340. Analytics engine 340 may access archive database 320 to provide a history of the system data from deployment until present. Analytics engine 340 may provide a summary report of historical use of a resource from time of deployment or use to the present. This may help understand the original purpose of deploying a resource and how the resource's role has changed. This helps determine which utilizations of the resource may be considered active and which may be considered routine.

Figure 4:
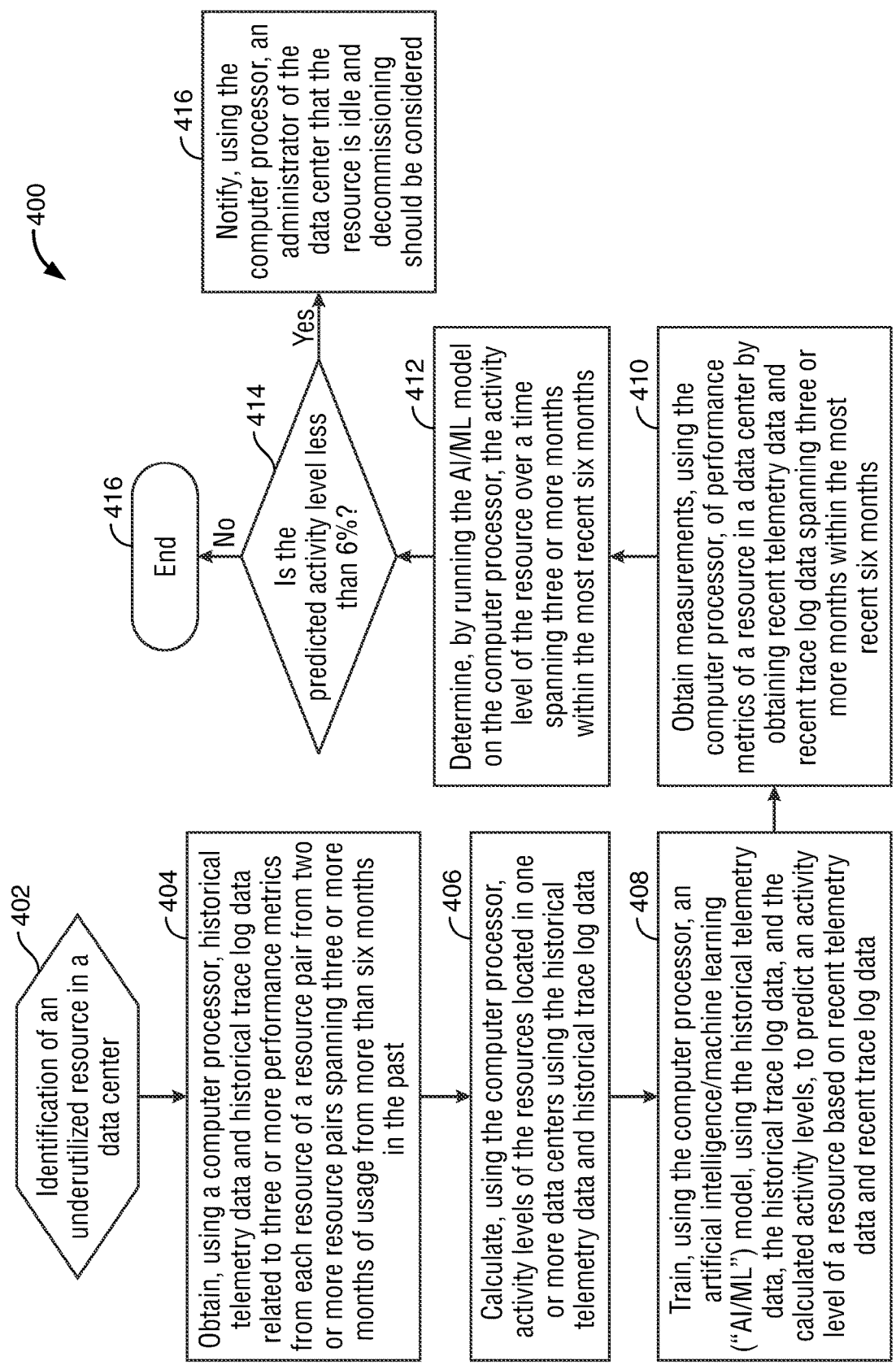
FIG. 4 shows an illustrative flowchart in accordance with principles of the disclosure.

FIG. 4 shows illustrative flowchart 400. Process 402 may detect an underutilized resource in a data center. A resource may be, for example, a server, a hypervisor, or a virtual machine (VM).

At step 404, a computer processor may obtain historical telemetry data and historical trace log data related to three or more performance metrics from each resource of a resource pair from two or more resource pairs spanning three or more months of usage from more than six month in the past. Historical H may illustrative over how many months data such as performance metrics were collected and how many months in the past the measurement of the performance metrics were completed. See Table 3.

At step 406, a computer processor may calculate activity levels of the resources located in one or more data centers using the historical telemetry data and historical trace log data.

At step 408, a computer processor may train an artificial intelligence/machine learning ("AI/ML") model, using the historical telemetry data, the historical trace log data, and the calculated activity levels, to predict an activity level of a resource based on recent telemetry data and recent trace log data.

At step 410, a computer processor may obtain measurements of performance metrics of a resource in a data center by obtaining recent telemetry data and recent trace log data. Recent Rr may illustrate lower limits and upper limits for time ranges for measurements of recent data related to performance metrics such as telemetry agent measurements, trace log measurements, or both. See Table 8. Recent Rp may illustrate how many months of data were collected for a range of time which is completed by a certain number of months in the past. See Table 9. For example, measurements of performance metrics may be measured over recent Rp where data was collected over three or more months within the most recent six months.

At step 412, a computer processor may run the AI/ML model to determine the activity level of the resource over a time spanning three or more months within the most recent six months.

Active capacity Ca may illustrate a lower limit and an upper limit for active capacity of a resource. See Table 4. Active capacity Ca may illustrate a lower limit for active capacity of a resource. See Table 5. Idle capacity Ci may illustrate a lower limit and an upper limit for idle capacity of a resource. See Table 6. Idle capacity Ci may illustrate an upper limit for active capacity of a resource. See Table 7.

At step 414, a computer processor may determine if the predicted activity level is less than 6% where 6% may be an upper limit for idle capacity Ci. If it is less than 6%, at step 416, the computer processor may notify an administrator of the data center that the resource is idle, and decommissioning should be considered. The process ends at step 418. If it is not less than 6%, where 6% may be a lower limit for active capacity Ca, then the process ends at step 418.

All ranges and parameters disclosed herein shall be understood to encompass all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 10.4, 3 to 8, 4 to 7), and finally to each number 1, 2, 3, 4, 5, 6, 7, 8, 10, and 10 contained within the range.

Thus, apparatus and methods for a prediction tool to detect underutilized data center resources have been provided. Persons skilled in the art will appreciate that the present invention can be practiced by other than the described examples, which are presented for purposes of illustration rather than of limitation. The present invention is limited only by the claims that follow.

What is claimed is:

1. A method for identification of an underutilized resource in a data center, the method comprising:
    obtaining, using a computer processor, historical telemetry data and historical trace log data related to three or more performance metrics from each resource of a resource pair from two or more resource pairs spanning three or more months of usage from more than six months before a current date;

wherein:
        a resource comprises a server, a hypervisor, or a virtual machine;
        the resource pair comprises an active server and an idle server, an active hypervisor and an idle hypervisor, or an active virtual machine and an idle virtual machine;
        the historical telemetry data come from measurements made by one or more telemetry agents located in proximity to the resource pair which they measure;
        the historical trace log data come from measurements made by one or more trace log agents located in proximity to the resource pairs which they measure;
        a performance metric comprises electricity usage, temperature data, input/output (I/O) utilization, inbound network activity related to secondary and tertiary applications, central processing unit (CPU) utilization, memory usage, connections, disk usage, and fan speed;
    calculating, using the computer processor, activity levels of the resources located in one or more data centers using the historical telemetry data and historical trace log data;
    training, using the computer processor, an artificial intelligence/machine learning ("AI/ML") model, using the historical telemetry data, the historical trace log data, and the calculated activity levels, to predict an activity level of a resource based on recent telemetry data and recent trace log data;
    wherein:
        the activity level is a ratio of an average usage of a resource over a period to a maximum usage potential of the resource;
        obtaining measurements, using the computer processor, of performance metrics of a resource in a data center by obtaining recent telemetry data and recent trace log data spanning three or more months within the most recent six months;
    wherein:
        the recent telemetry data is measured with a telemetry agent in proximity to the resource; and
        the recent trace log data is measured with a trace log agent in proximity to the resource;
        determining, by running the AI/ML model on the computer processor, the activity level of the resource over a time spanning three or more months within six months before the current date;
    wherein:
        to be designated as an active server, an active hypervisor, and an active virtual machine, the activity level is at least 6%; and
        to be designated as an idle server, an idle hypervisor, and an idle virtual machine, the activity level is less than 6%; and
        when the activity level of the resource is less than 6% spanning three or more months within six months before the current date, notifying, using the computer processor, an administrator of the data center that the resource is idle.

2. The method of claim 1, wherein notifying an administrator of the data center includes providing the administrator with:
    identification information associated with the resource;
    the activity level of the resource; and
    an indication that the resource is a candidate for decommissioning.

3. The method of claim 1, wherein notifying the administrator of the data center includes providing the administrator with:
- identification information associated with the resource;
- the activity level of the resource; and
- an indication that the resource is a candidate for redeployment.

4. The method of claim 1, wherein when the activity level of the resource is less than 6% over three or more of the most months within six months before the current date, before notifying an administrator of the data center:
- further comprising running, using the computer processor, a status check engine to assess applications currently running on the resource;
- when the applications currently running on the resource are part of routine maintenance of the resource, notifying the administrator of the data center that the resource is idle.

5. The method of claim 4, wherein before notifying an administrator of the data center:
- further comprising, running, using the computer processor, an analytics engine to verify that applications assessed to be part of routine maintenance are part of routine maintenance based on assessing how the applications have been used on the resource over a lifetime of use of the resource in the data center,
- when verifying that the applications are part of routine maintenance, notifying the administrator of the data center that the resource is idle.

6. The method of claim 1, wherein when the activity level of the resource is less than 6% over three or more months within six months before the current date, before notifying an administrator of the data center:
- further comprising, running, using the computer processor, a discovery engine to assess applications running on the resource spanning months when a status of idle were designated by the AI/ML model, and when the applications were part of routine maintenance of the resource; and
- when verifying that the applications are part of routine maintenance, notifying the administrator of the data center that the resource is idle.

7. The method of claim 1, wherein when the activity level of the resource is less than 6% over three or more months within six months before the current date, before notifying an administrator of the data center:
- further comprising, running, using the computer processor, an analytics engine to verify that applications assessed to be part of routine maintenance are indeed part of routine maintenance based on assessing how the applications have been used on the resource over a lifetime of use of the resource in the data center; and
- when verifying that the applications are part of routine maintenance, notifying the administrator of the data center that the resource is idle.

8. The method of claim 1, wherein historical telemetry data and historical trace log data are obtained for five or more performance metrics from each resource of a resource pair from two or more resource pairs from three or more months more than six month before the current date.

9. The method of claim 1, wherein historical telemetry data and historical trace log data are obtained for three or more performance metrics from each resource of a resource pair from three or more resource pairs spanning three or more months of usage from more than six months before the current date.

10. The method of claim 1, wherein historical telemetry data and historical trace log data are obtained for three or more performance metrics from each resource of a resource pair from two or more resource pairs spanning five or more months of usage from more than six months before the current date.

11. The method of claim 1, wherein recent telemetry data and recent trace log data are obtained for five or more performance metrics from a resource spanning five or more months within six months before the current date.

12. The method of claim 1, wherein the resource is selected from the group consisting of a server and a hypervisor, and both a server and a hypervisor.

13. The method of claim 1, wherein the resource is not a virtual machine.

14. A method for identification of an underutilized resource in a data center, the method comprising:
- obtaining, using a computer processor, historical telemetry data and historical trace log data related to three or more performance metrics from each resource of a resource pair from two or more resource pairs spanning three or more months of usage from more than six months before a current date;

wherein:
- a resource comprises a server, a hypervisor, or a virtual machine;
- the resource pair comprises an active server and an idle server, an active hypervisor and an idle hypervisor, or an active virtual machine and an idle virtual machine;
- the historical telemetry data come from measurements made by one or more telemetry agents located in proximity to the resource pair which they measure;
- the historical trace log data come from measurements made by one or more trace log agents located in proximity to the resource pairs which they measure;
- a performance metric comprises electricity usage, temperature data, input/output (I/O) utilization, inbound network activity related to secondary and tertiary applications, central processing unit (CPU) utilization, memory usage, connections, disk usage, and fan speed;

calculating, using the computer processor, activity levels of the resources located in one or more data centers using the historical telemetry data and historical trace log data;

training, using the computer processor, an artificial intelligence/machine learning ("AI/ML") model, using the historical telemetry data, the historical trace log data, and calculated activity levels, to predict an activity level of a resource based on recent telemetry data and recent trace log data;

wherein:
- the activity level is a ratio of an average usage of a resource over a period to a maximum usage potential of the resource;

obtaining measurements, using the computer processor, of performance metrics of a resource in a data center by obtaining recent telemetry data and recent trace log data spanning three or more months within six months before the current date;

wherein:
- the recent telemetry data is measured with a telemetry agent in proximity to the resource;
- the recent trace log data is measured with a trace log agent in proximity to the resource;

determining, by running the AI/ML model on the computer processor, the activity level of the resource over a time spanning three or more months within the most recent six months;

wherein:
to be designated as an active server, an active hypervisor, and an active virtual machine, the activity level is at least 10%;
to be designated as an idle server, an idle hypervisor, and an idle virtual machine, the activity level is less than 10%;
when the activity level of the resource is less than 10% spanning three or more months within six months before the current date, running, using the computer processor:
a status check engine to assess applications currently running on the resource are part of routine maintenance; and
a discovery engine to assess applications running on the resource spanning months, when a status of idle was designated by the AI/ML model, were part of routine maintenance;
when the status of idle was designated by the AI/ML model, using the computer processor to run an analytics engine to verify that applications assessed to be part of routine maintenance by the AI/ML model are indeed part of routine maintenance based on assessing how the applications have been used on the resource over a lifetime of use of the resource in the data center; and
when verifying that the applications are part of routine maintenance, notifying an administrator of the data center that the resource is idle.

15. The method of claim 14, wherein the resource is selected from the group consisting of a server and a hypervisor, and both a server and a hypervisor.

16. The method of claim 14, wherein the resource is not a virtual machine.

17. An apparatus for automating identification of an underutilized resource in a data center, the apparatus comprising:
a computer processor running in a data center;
an artificial intelligence/machine learning ("AI/ML") model running on the computer processor;
one or more resources located in the data center, wherein the resource comprises a server, a hypervisor, and a virtual machine;
two or more resource pairs, wherein the resource pair comprises an active server and an idle server, an active hypervisor and an idle hypervisor, or an active virtual machine and an idle virtual machine;
an application in communication with the resource;
a status check engine operating in the data center;
a discovery engine operating in the data center;
an analytics engine operating in the data center;
a trace log agent located in proximity to the resource and in communication with the resource and the application;
a telemetry agent located in proximity to the resource and in communication with the resource;
wherein the computer processor is configured to:
use the trace log agent to obtain historical trace log data from the one or more resources of the two or more resource pairs spanning three or more months of usage from more than six months before a current date;
use the telemetry agent to obtain historical telemetry data related to three or more performance metrics from the one or more resources of the two or more resource pairs spanning three or more months of usage from more than six months before a current date;
wherein the performance metric comprises electricity usage, temperature data, input/output (I/O) utilization, inbound network activity related to secondary and tertiary applications, central processing unit (CPU) utilization, memory usage, connections, disk usage, and fan speed;
calculate activity levels of the one or more resources located in the data center using the historical telemetry data and historical trace log data;
wherein the performance metric comprises electricity usage, temperature data, input/output (I/O) utilization, inbound network activity related to secondary and tertiary applications, central processing unit (CPU) utilization, memory usage, connections, disk usage, and fan speed;
train the AI/ML model, using the historical telemetry data, the historical trace log data, and calculated activity levels, to predict a recent activity level of the one or more resources based on recent telemetry data and recent trace log data;
wherein the activity level is a ratio of an average usage of a resource over a period to a maximum usage potential of the resource;
obtain measurements of performance metrics of a resource in a data center by obtaining recent telemetry data and recent trace log data spanning three or more months within six months before the current date;
determine, by running the AI/ML model, the activity level of the resource over a time spanning three or more months within the most recent six months;
wherein:
to be designated as an active server, an active hypervisor, and an active virtual machine, the activity level is at least 10%; and
to be designated as an idle server, an idle hypervisor, and an idle virtual machine, the activity level is less than 10%;
run, when the activity level of the resource is less than 10% spanning three or more months within six months before the current date:
a status check engine to assess applications currently running on the resource are part of routine maintenance; and
a discovery engine to assess applications running on the resource spanning months, when a status of idle was designated by the AI/ML model, were part of routine maintenance;
run, when a status of idle was designated by the AI/ML model, the analytics engine to verify that applications assessed to be part of routine maintenance by the AI/ML model are indeed part of routine maintenance based on assessing how the applications have been used on the resource over a lifetime of use of the resource in the data center; and
notify, when verifying that the applications are part of routine maintenance, an administrator of the data center that the resource is idle.

18. The apparatus of claim 17, wherein the resource is selected from the group consisting of a server and a hypervisor, and both a server and a hypervisor.

19. The apparatus of claim 17, wherein the resource is not a virtual machine.

* * * * *